United States Patent Office

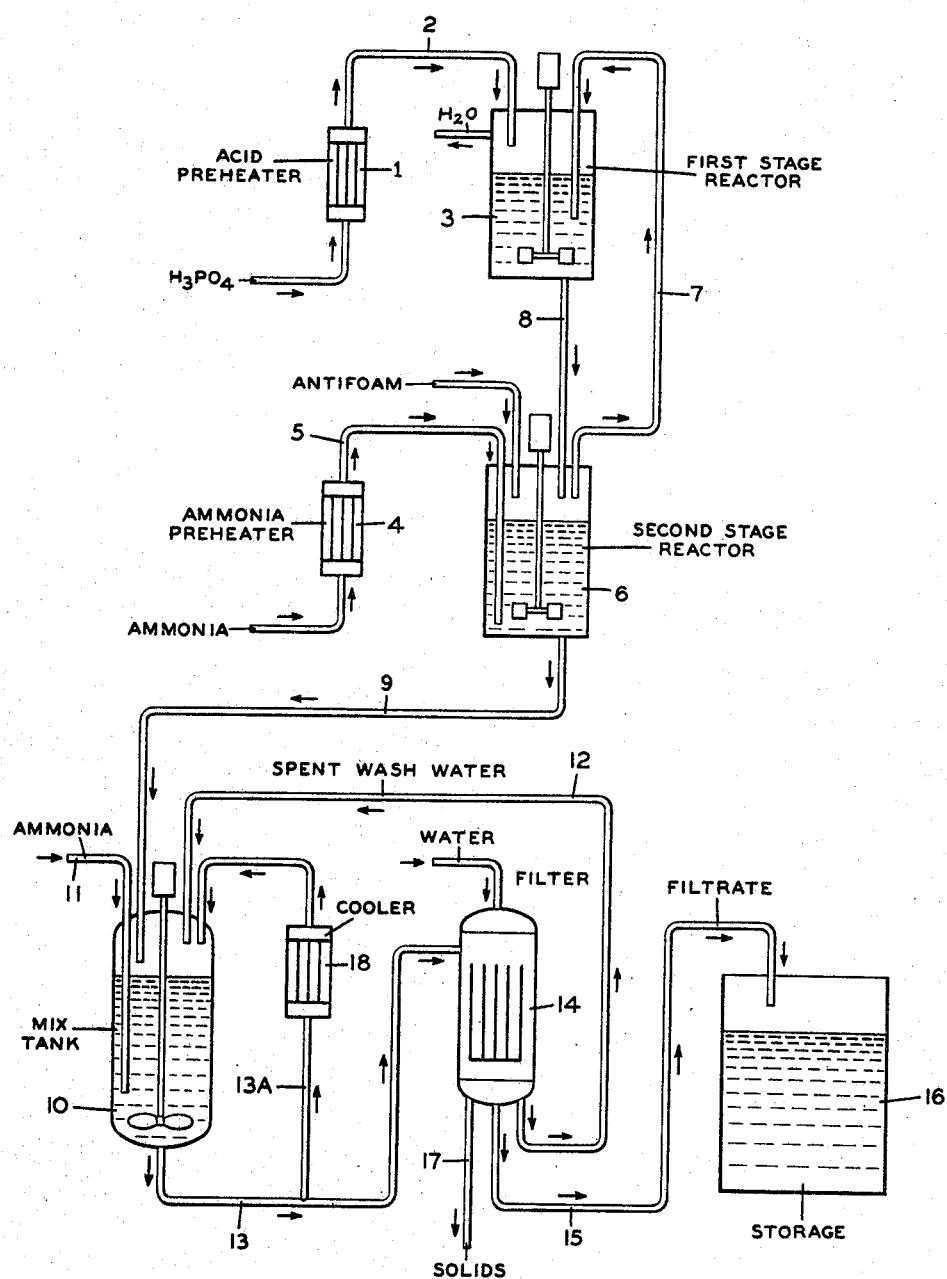

3,492,087
Patented Jan. 27, 1970

3,492,087
PRODUCTION OF AMMONIUM POLYPHOSPHATES
Rob R. MacGregor and Albert J. Stanley, Hopewell, and William P. Moore, Chester, Va., assignors to Allied Chemical Corporation, New York, N.Y., a corporation of New York
Filed July 26, 1966, Ser. No. 568,040
Int. Cl. C01b 25/28
U.S. Cl. 23—106  2 Claims

ABSTRACT OF THE DISCLOSURE

Relatively pure ammonium polyphosphate fertilizer solution is prepared by introducing preheated ammonia into wet process phosphoric acid, heating the mixture to at least 205° C. to produce an anhydrous molten mass which is then dissolved in an aqueous medium. Filterable solids are separated from the resulting clear ammonium polyphosphate solution. The ammoniation is preferably conducted in two stages, wherein preheated anhydrous ammonia is introduced into the second stage and the unabsorbed ammonia therefrom is used to partially neutralize the acid in the first stage.

---

This invention relates to the production of ammonium polyphosphate solutions. More particularly, it relates to the production of relatively pure ammonium polyphosphate fertilizer solutions by the direct ammoniation of wet process phosphoric acid.

Wet phosphoric acid is produced by decomposing phosphate rock, particularly calcium phosphate, with sulfuric acid and separating the phosphoric acid from the precipitated calcium sulfate. The resulting crude phosphoric acid contains various amounts of impurities such as iron, aluminum, calcium, magnesium and other metals in the form of their phosphates, sulfates or fluorides, depending on the characteristics of the particular phosphate rock which is used as a starting material. Because of the simplicity and cheapness of its manufacture, wet process phosphoric acid is regarded as an excellent source of fertilizer grade phosphates. However, because of the presence of the aforementioned impurities its use is fraught with many difficulties and complications and has heretofore been limited. As is well known, when wet process phosphoric acid is treated with ammonia to form aqueous ammonium phosphate solutions, the impurities present in the acid form gelatinous precipitates which are extremely difficult to separate from the aqueous phase by filtration or other conventional methods. These precipitates form large deposits in the equipment used for storage and transfer and make handling difficult. The prior art discloses several attempts to overcome this difficulty. The use of sequestering agents, such as sodium hexametaphosphate, has proved unsatisfactory. Other methods involve heat treatment under controlled conditions to form various compounds which retain the metal impurities in solution, but such methods have the disadvantage of tieing up substantial amounts of polyphosphate. For example, it has been found that when more than about 2% of $Al_2O_3$ and $Fe_2O_3$ are present the availability of the phosphate is substantially reduced due to the formation of iron and aluminum pyrophosphates. Still another prior art method for overcoming the aforementioned problem comprises neutralizing the crude phosphoric acid at elevated pressure and temperature to cause the metal compounds to precipitate in a form which is readily filtered from the resulting polyphosphate solution. This process has the disadvantage of requiring pressure resistant equipment which adds to the cost.

In view of the foregoing, it is an object of the present invention to provide an improved process for producing ammonium polyphosphate solutions.

It is a further object of the present invention to provide an economical process for producing relatively pure ammonium polyphosphate fertilizer solutions from wet process phosphoric acid which solutions are substantially free of precipitated material.

These and other objects and advantages which will be obvious hereinafter are achieved by the present invention which is set forth in the following description wherein parts and percentages are by weight and temperatures are in degrees centigrade unless otherwise specified.

According to the present invention, ammonium polyphosphate solutions are produced by a process which comprises introducing ammonia into wet process phosphoric acid, heating the resulting reaction mixture under low pressure to a temperature of at least 205° C. to vaporize water from said mixture and produce a substantially anhydrous molten mass of ammonium polyphosphate, dissolving said molten mass in an aqueous medium to form a solution containing filterable solids, and separating the solids and recovering a clear ammonium polyphosphate solution.

The phosphoric acid used in the process of the present invention is usually commercial wet process phosphoric acid containing about 25% to 55% $P_2O_5$. Such acid usually contains about .8 to 1.8% iron, .6 to 1.3% aluminum, 0.2 to 0.5% magnesium, 0.04 to 0.4% calcium, 0.04 to 0.1% potassium and 0.03 to 0.1% sodium, analyzed in the form of the respective oxides. However, some of the metal cations may be removed prior to use by any suitable means such as ion exchange or liquid-liquid extraction. Also, if desired, the acid feed for this process may consist of a mixture of wet process phosphoric acid and furnace grade phosphoric acid in such proportions that the metal cation content is about 50 to 90% of what it would be using commercial wet process phosphoric acid alone. Reduction of metal impurities in the feed acid tends to improve the availability of $P_2O_5$ in the fertilizer product.

It is advantageous to preheat the phosphoric acid to a temperature of at least 35° C., preferably 115° to 135° C. prior to reacting it with the ammonia.

The pressure under which the reaction mixture is heated should be sufficiently low to allow vaporization of water present in the acid as well as that which is split off during the formation of the polyphosphate. Pressures below two atmospheres are advantageously used, thus permitting the use of less costly equipment.

A reaction temperature of at least 205° C. is necessary for polyphosphate formation. Preferably temperatures above about 300° C. are avoided, since at such high temperatures solids tend to form which could hamper product transfer at this stage of the process. The preferred temperature range is 245° to 265° C.

The heating is continued until a substantially anhydrous melt is obtained; that is one that contains less than 5% water. Preferably, the melt contains less than 3% water.

Sufficient ammonia is preferably introduced to give a melt having a pH in the range 2.6 to 4.2 in 5% aqueous solution.

The ammonium polyphosphate melt may be cooled and stored, but preferably is dissolved directly in aqueous ammonia, water, or other aqueous medium. The preferred solvent is aqueous ammonia of sufficient concentration to produce a solution containing about 10 to 12% nitrogen and about 33 to 37% $P_2O_5$. Temperature during dissolution is preferably maintained at about 30 to 100° C. The higher the temperature within this range the greater the percentage of metal impurities which precipitates in the form of filterable solids. However, above about 100° C. there is risk of loss of polyphosphate due to hydrolysis.

The aqueous solution formed as above contains about 4 to 8% filterable solids in fine granular form and composed largely of iron and aluminum complexes of ammonium phosphates, and has a pH in the range about 5.8 to 6.4. This solution is preferably fed directly to a filter or centrifuge for solids removal. The equipment used can be that conventionally employed in the art for the separation of solids from liquids, for example a leaf filter, a rotary filter or a perforated bowl type centrifuge or a scroll type centrifuge. Surprisingly, the solids are not gelatinous and no filtration problems are encountered.

The solids can be washed to recover soluble phosphates and the wash water recycled to the process.

The liquid ammonium polyphosphate product of this process is relatively pure because most of the impurities are removed in the filtration step. This product has substantial value in the fertilization of crops because of its ability to supply easily dispensed primary nutrients as well as the trace amounts (usually less than 1% by weight of the solution) of metallic micro nutrients. In addition the product is very stable since it contains only a small percentage of impurities and is stabilized by the polyphosphate content which acts as a sequestering agent for the trace elements present. Such solutions will remain stable, i.e., substantially free from precipitated solids for at least 30 days at normal temperatures. The solutions have a nitrogen content of about 10 to 12%, a $P_2O_5$ content of about 33 to 37% and a pH in the range 5.8 to 6.4.

Formation of the ammonium polyphosphate melt can be carried out in a stepwise manner wherein the wet process phosphoric acid is first partially neutralized with ammonia at an intermediate temperature to pH up to about 2.2 and then further neutralized at 225° to 300° C. For example, wet process phosphoric acid can be continuously ammoniated countercurrently in two reaction stages. The wet process acid is preheated and fed to the first stage reactor. Anhydrous ammonia is fed to the second stage reactor. The second stage reactor is operated at the ammonia saturation point so that some of the ammonia is not absorbed and passes to the first stage, together with steam produced in the second stage. The first stage then serves to absorb all the ammonia lost in the second stage and to take advantage of off gas heat content. Partially neutralized acid from the first stage is fed continuously to the second stage. Operating temperature is maintained at 130° C. to 180° C. in the first stage and 225° C. to 300° C. in the second stage. The ammonium polyphosphate melt continuously produced in the second stage normally contains about 11.5 to 12.5% nitrogen and 58 to 61% $P_2O_5$, by weight. About 30 to 70% of the $P_2O_5$ in the melt is present as polyphosphate.

The retention time of the phosphoric acid in the first stage varies with the feed rates of ammonia and phosphoric acid and the temperature and pH, but is usually in the range 0.5 to 50 minutes, preferably 15 to 30 minutes. The retention time should be long enough to assure consumption of substantially all of the unreacted ammonia from the second stage, but not so long that the pH of a 5% solution of the acid goes above about 2.2, at which point insolubles tend to form.

The anhydrous ammonia used in the second neutralization stage is advantageously preheated to a temperature in the range 35 to 650° C., preferably 350 to 550° C.

As in the first stage the residence time of the reaction mixture in the second stage varies with the feed rates of the reactants, the final pH and the reaction temperature, but is generally in the range 0.5 to 50 minutes, more usually 15 to 30 minutes. A pH above 4.2 is preferably avoided in order to assure the absence of solids which would hamper transfer of the polyphosphate melt.

With reference to the accompanying flow diagram, in accordance with a preferred mode of carrying out the present invention wet process phosphoric acid is continuously ammoniated countercurrently in two reaction stages, dissolved in aqueous ammonia and filtered. The wet process phosphoric acid containing about 0.5 to 10% metal impurities, calculated as oxides, enters preheater 1 where it is heated to a temperature in the range 35° to 175° C., preferably 115° to 135° C. The preheated acid is fed via line 2 to the first stage reactor 3, operating at a temperature in the range 130° to 180° C., and atmospheric pressure. Anhydrous ammonia enters preheater 4 where it is heated to 35° to 650° C., preferably 350° to 550° C. The preheated ammonia is fed via line 5 to the second stage reactor 6 which is operated at the ammonia saturation point so that some of the ammonia is not absorbed and passes via line 7 to the first stage reactor 3 together with steam produced in the second stage. Temperature in reactor 6 is 225° to 300° C.; pressure between 1 and 2 atmospheres. The phosphoric acid in first stage reactor 3 consumes all the unreacted ammonia from reactor 6. Water vapor is vented. The heat content of the off gases from reactor 6 is also utilized in reactor 3. Partially neutralized acid from reactor 3 passes continuously via line 8 to reactor 6 where it is neutralized to a pH in the range 2.6 to 4.2, preferably 3.0 to 4.0 by the anhydrous ammonia. A small amount of anti-forming agent is also preferably introduced continuously to reactor 6. The ammonium polyphosphate melt continuously produced in reactor 6 passes via line 9 to a mix tank 10 where it is combined with ammonia entering via line 11 and spent wash water entering via line 12. The mix tank is operated at 30° to 100° C. The slurry formed in the mix tank is passed via line 13 to a filter unit 14 for removal of solids. A small recycle of slurry is preferably passed via line 13A through cooler 18 back to the mix tank for purposes of temperature control and to improve mixing. The filtrate from filter 14 is passed to a storage tank 16 via line 15. The solids after washing with water exit the filter via line 17 and the spent wash water is recycled to the mix tank 10 via line 12.

Superficially, it would appear wasteful to remove water in one stage of a process and add water at another stage. However, we have surprisingly found that by carrying out the process in the manner described the beneficial results disclosed above are achieved.

EXAMPLE I

Wet process phosphoric acid containing 50.3% $P_2O_5$ was preheated to 135° C. and fed at a rate of 126.9 pounds per hour to the first stage of a two stage reactor. The acid contained about 3 weight percent total metal impurities, calculated as metal oxides. Unreacted ammonia and steam from the second stage reactor were passed via a dip tube into the stirred reaction mass of the first stage. The ammonia-steam mixture, containing 30.3 weight percent $NH_3$ and at a temperature of 260° C. was fed in at 23.2 pounds per hour. The first stage reactor was operated at 140° C., atmospheric pressure, 20–30 minutes retention time and with the pH maintained at 1.7 to 1.9. The first stage reactor was 15-gallon capacity flat bottom tank with a 1000 r.p.m. turbine type agitator.

Effluent from first stage reactor had the following composition:

| Component: | Weight percent |
|---|---|
| $NH_3$ | 6.0 |
| $P_2O_5$ | 54.1 |
| $H_2O$ | 37.4 |
| Other | 2.5 |

It was pumped to the second stage reactor for reaction with anhydrous ammonia. The ammonia was pumped at 15.3 pounds per hour through a preheater and into the second stage reactor via a dip tube. The second stage reactor temperature was maintained at 260° C. In this operation, water was evaporated and 54% of the ammonia was consumed. The evaporated water and unreacted ammonia were passed to the first stage reactor as noted above. The second reactor was operated at about 5 p.s.i.g. pressure and the unreacted ammonia and steam were forced into the reaction mass of first reactor through a dip tube. Retention time in reactor was 20–30 minutes and pH was maintained at 3.3 to 3.6. This reactor was a 12-gallon flat bottom tank equipped with an 800 r.p.m. turbine type agitator. Antifoam as 10% Pluronic–L–61 in methanol was pumped into the second stage reactor continuously in an amount equivalent to 0.04 weight percent of the acid feed. (Pluronic–L–61: a polyethylene propylene ether glycol having a polypropylene oxide nucleus of molecular weight of about 1500 capped on each end with ethylene oxides to make a polyether glycol having an average molecular weight of about 2000) and having about 13% ethylene oxide units. The ammonium polyphosphate melt effluent from the second stage reactor had the following

| Component: | Weight percent |
|---|---|
| $NH_3$ | 13.9 |
| $P_2O_5$ | 58.0 |
| $H_2O$ | 2.4 |
| Other | 2.7 |

Of the total $P_2O_5$ present, 60 weight percent was present as polyphosphate.

Effluent from the second reactor was pumped at 110.0 pounds per hour to a mix tank where it was combined with 6.5 pounds per hour ammonia and 68.4 pounds per hour of spent wash water from the filter. A minor amount of soluble phosphates was recovered by using the spent wash water which had the following composition:

| Component: | Weight percent |
|---|---|
| $NH_3$ | 0.7 |
| $P_2O_5$ | 1.9 |
| $H_2O$ | 97.4 |

The mix tank was operated at 50° C., atmospheric pressure and with pH of 6.1 to 6.3. Tank temperature was controlled by passing the slurry through an external cooler. The resulting mixture was a slurry with 5.5 weight percent solids and having an overall composition as follows:

| Component: | Weight percent |
|---|---|
| $NH_3$ | 12.0 |
| $P_2O_5$ | 35.2 |
| $H_2O$ | 51.2 |
| Other | 1.6 |

This slurry was filtered in a leaf type unit to remove the solids which, after washing with 64.7 pounds per hour of water had the following composition:

| Component: | Weight percent |
|---|---|
| $NH_3$ | 9.1 |
| $P_2O_5$ | 52.1 |
| $H_2O$ | 21.1 |
| Other | 17.7 |

Washed solids (10.9 pounds per hour) were removed intermittently by sluicing with water.

The clear green filtrate was pumped to a storage tank at 170.3 pounds per hour; it had the following composition:

| Component: | Weight percent |
|---|---|
| $NH_3$ | 12.2 |
| $P_2O_5$ | 34.1 |
| $H_2O$ | 53.1 |
| Other | 0.6 |

The polyphosphate $P_2O_5$ content of this solution was 57 weight percent of the total $P_2O_5$. Recovery of $P_2O_5$ to final liquid product was 92%. Analysis of the fertilizer solution for metal cations was made to show that concentration is much lower than commercial products presently available.

| Metal cation: | Wt. percent in fertilizer solution |
|---|---|
| Iron | 0.05 |
| Aluminum | 0.08 |
| Magnesium | 0.06 |

We claim:
1. A process for the production of a stable ammonium polyphosphate solution from wet-process phosphoric acid, said ammonium polyphosphate solution containing 10–12% nitrogen and 33–37% $P_2O_5$, wherein about 30–70% of the $P_2O_5$ is in the polyphosphate form, which comprises the steps of:
 (a) partially neutralizing the wet-process phosphoric acid with ammonia at a temperature in the range 130° to 180° C. and at substantially atmospheric pressure to raise the pH of the acid to, at most, 2.2, whereby an aqueous solution of partially ammoniated phosphoric acid is formed;
 (b) vaporizing water from the aqueous soltuion of partially ammoniated phosphoric acid until a substantially anhydrous melt is obtained and simultaneously further neutralizing the acid with anhydrous ammonia at a temperature in the range of 205° to 300° C. and a pressure below two atmospheres until the pH of the resulting melt is in the range 2.6 to 4.2, whereby about 30–70% of the partially ammoniated wet-process phosphoric acid is condensed by loss of water into partially ammoniated polyphosphoric acid;
 (c) dissolving the resulting reaction melt at 30–100° C. in aqueous ammonia of sufficient concentration to form a solution containing 10–12% nitrogen and 33–37% $P_2O_5$ having about 30–70% of the total $P_2O_5$ in the polyphosphate form, said polyphosphate solution containing filterable solids; and
 (d) separating the solids and recovering a clear ammonium polyphosphate solution which remains substantially free from precipitated solids for at least 30 days at normal storage temperatures.

2. A process as claimed in claim 1 wherein step (a) is conducted at about 140° C., step (b) is conducted at about 260° C., step (c) is conducted at about 50° C. and sufficient aqueous ammonia is used in step (c) to adjust the pH of the solution to about 6.

References Cited

UNITED STATES PATENTS

| 3,264,087 | 8/1966 | Slack et al. | 71—43 |
| 3,201,195 | 8/1965 | Huber | 23—107 |

OTHER REFERENCES

TVA, New Developments in Fertilizer Technology, 5th Demonstration, Oct. 6–7, 1964, pp. 38–41.

TVA, New Developments in Fertilizer Technology, 6th Demonstration, Oct. 4–5, 1966, pp. 67–71.

OSCAR R. VERTIZ, Primary Examiner

H. S. MILLER, Assistant Examiner

U.S. Cl. X.R.

23—107, 285; 71—43